United States Patent
Gaine et al.

(10) Patent No.: US 11,727,158 B2
(45) Date of Patent: Aug. 15, 2023

(54) DEVICE FOR PROTECTING AND SUPERVISING AN ELECTRONIC SYSTEM COMPRISING AT LEAST ONE ELECTRONIC COMPONENT, ASSOCIATED METHOD FOR PROTECTING AND SUPERVISING THE INTEGRITY OF THE ELECTRONIC SYSTEM AND OF THE DEVICE, AND FOR JAMMING ATTACKS

(71) Applicant: COMMISSARIAT A L'ENERGIE ATOMIQUE ET AUX ENERGIES ALTERNATIVES, Paris (FR)

(72) Inventors: Clément Gaine, Grenoble (FR); Jean-Pierre Nikolovski, Grenoble (FR); Driss Aboulkassimi, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 17/582,049

(22) Filed: Jan. 24, 2022

(65) Prior Publication Data
US 2022/0237334 A1 Jul. 28, 2022

(30) Foreign Application Priority Data
Jan. 26, 2021 (FR) ...................................... 21 00695

(51) Int. Cl.
*G06F 21/87* (2013.01)
*G06F 21/75* (2013.01)
(52) U.S. Cl.
CPC .............. *G06F 21/87* (2013.01); *G06F 21/75* (2013.01)

(58) Field of Classification Search
CPC ................................. G06F 21/87; G06F 21/75
See application file for complete search history.

(56) References Cited

U.S. PATENT DOCUMENTS 8,496,171 B2 * 7/2013 Ross ................... G07F 19/2055
235/439
10,230,521 B2 * 3/2019 Wurcker ................ H04L 9/002
(Continued)

FOREIGN PATENT DOCUMENTS

WO WO 2007/057325 A1 5/2007

OTHER PUBLICATIONS

French Preliminary Search Report dated Sep. 21, 2021 in French Application 21 00695 filed on Jan. 26, 2021, citing documents AA-AB & AX therein, 3 pages (with English Translation of Categories of Cited Documents)
(Continued)

*Primary Examiner* — Viral S Lakhia
(74) *Attorney, Agent, or Firm* — Oblon, McClelland, Maier & Neustadt, L.L.P.

(57) ABSTRACT

A device for protecting an electronic system, such as an integrated circuit, the device incorporating a pulse transformer including a ferrite sheet or layer with low magnetic losses that covers a surface of the electronic system and that is encircled by two coils that are located a distance away from each other, one of these coils, the transmission coil, being connected to a transmission stage for transmitting electrical pulses, and the other of these coils, the reception coil, being connected to a reception stage, the whole thing being connected to and controlled by a microcontroller.

29 Claims, 8 Drawing Sheets

(56) References Cited

U.S. PATENT DOCUMENTS

| | | | | |
|---|---|---|---|---|
| 10,711,602 | B2 * | 7/2020 | Donderici | E21B 49/00 |
| 11,178,166 | B2 * | 11/2021 | Al Faruque | H04L 63/1466 |
| 11,181,566 | B2 * | 11/2021 | Xue | G06F 21/75 |
| 11,366,899 | B2 * | 6/2022 | Kirschner | G06F 21/554 |
| 11,567,855 | B1 * | 1/2023 | Fletcher | G06F 11/277 |
| 2011/0183133 | A1 * | 7/2011 | Osada | C01G 23/005 |
| | | | | 252/62.51 R |
| 2015/0351292 | A1 | 12/2015 | Chang et al. | |
| 2016/0165767 | A1 * | 6/2016 | Tsai | C08K 7/00 |
| | | | | 427/205 |
| 2019/0372751 | A1 | 12/2019 | Yanamadala et al. | |
| 2020/0045859 | A1 * | 2/2020 | Kagawa | B32B 15/16 |
| 2020/0104485 | A1 * | 4/2020 | Crouch | G06F 21/554 |
| 2021/0216632 | A1 * | 7/2021 | Bean | G06F 21/566 |
| 2022/0237334 | A1 * | 7/2022 | Gaine | G06F 21/87 |

OTHER PUBLICATIONS

Dumont, "Modelisation de l'injection de faute electromagnetique sur circuits integres securises et contre-mesures", Chapter 4, Oct. 9, 2020, 13 pages, XP055843204.

Homma et al., "EM Attack is Non-Invasive?—Design Methodology and Validity Verification of EM Attack Sensor", LNCS, vol. 8731, Springer-Verlag, 2014, 16 pages.

* cited by examiner

DEVICE FOR PROTECTING AND SUPERVISING AN ELECTRONIC SYSTEM COMPRISING AT LEAST ONE ELECTRONIC COMPONENT. ASSOCIATED METHOD FOR PROTECTING AND SUPERVISING THE INTEGRITY OF THE ELECTRONIC SYSTEM AND OF THE DEVICE, AND FOR JAMMING ATTACKS

TECHNICAL FIELD

The present invention relates to the general field of protecting components, circuits and electronic systems.

It in particular relates to protecting components, circuits or electronic systems from physical attacks such as attacks involving fault injection and analysis of the electronic radiation emitted by at least one electronic component, side-channel attacks, laser-based attacks, attacks based on thermal and mechanical shocks or, indeed, attempts to break into an electronic package with a view to reverse engineering or accessing sensitive data.

Any application in which it is sought to ensure security on the scale of an electronic component, of an electronic circuit or of an electronic system is envisionable.

PRIOR ART

The interconnection and ubiquity of electronic information-processing systems have led to vulnerabilities that enable attacks that may be coordinated and complex, and sometimes carried out in only a few minutes.

One of the problems to be solved is that of making electronic components immune, on the unit scale, on the scale of a circuit or of an electronic system, to electromagnetic attacks, in particular attacks involving injection of faults that are localized in time and space, and of decreasing their electromagnetic radiation when they are in operation and, by generating a jamming inductance above the circuit to be protected, coupling to components.

In particular, chip cards are subject to many hacking attempts, these in particular involving active attacks based on fault injection, during which attacks the potential hacker physically disrupts the integrated circuit of the latter with a view to modifying the behavior of the latter and diverting the software code to another type of execution. In particular, the injection of light rays or, more generally, electromagnetic waves (laser, white light, a magnetic wave, etc.), disrupts the operation of the electronic components and may, thus, introduce faults into the operation of the software loaded into these components.

To solve this type of problem, one known solution consists in shielding the electronic circuit to be protected with a passive shield obtained by arranging passive, electrically conductive, protective layers (for example sheets or layers of copper typically of a thickness of a few tens of microns, or a ferrite sheet or layers applied by means of adhesive) around at least one portion of the circuit.

For example, patent application WO2007/057325 provides, by way of device for protecting an electronic chip from fault-injection attacks, a chip-encapsulation material that exhibits random variations in refractive index. The material thus allows any attacking electromagnetic pulse to be temporarily deformed, so as to decrease its temporal locality. Such a device is relatively ineffective insofar as the protection is solely passive and does not allow an attack to be detected and a countermeasure to be deployed during a critical period of operation of the chip to be protected, during which period encryption operations are carried out. It is also not able to verify its own integrity, i.e. it is not possible to inform the chip to be protected of the state of wear of the encapsulation material should the latter undergo mechanical or chemical abrasion.

Another known protection solution is presented in publication [1]. It is a question of a method for protecting from side-channel and fault-injection attacks that employs a dual-coil sensor the main axis of sensitivity of which is oriented perpendicular to the plane to which the circuit to be protected is soldered. On approach of an inductive attack probe, its coil, which might be referred to as the attack coil, and the detection coil arranged on the surface of the electronic circuit to be protected, become coplanar and hence a mutual inductance of significant value appears and allows a portion of the injection signal to be coupled to the sensor. This method is an effective way of detecting the approach of a probe above the electronic circuit to be protected, using an LC oscillator. Nevertheless, it is probably too sensitive, because provision is made neither for shielding, nor for means intended to decrease the amplitude of the magnetic induction, nor for means for monitoring the integrity of the attack-detecting device, and hence, in the case of high-intensity attacks, the detection coil may become a secondary source of disruption that may damage, or even generate faults in, the electronic circuit to be protected, via induction in the electrical power-supply networks of the circuit. It also does not provide any means for taking countermeasures by randomly jamming such signals, nor moreover any means for locating the position of the attack probe above the circuit to be protected.

Therefore, there is a need to improve solutions for protecting an electronic system comprising at least one electronic component, in particular from electromagnetic attacks, and in order to mitigate the aforementioned drawbacks.

The aim of the invention is to at least partly meet this need.

DESCRIPTION OF THE INVENTION

To this end, one subject of the invention is firstly a device for protecting and supervising an electronic system comprising at least one electronic component, such as an integrated circuit (IC), in particular against electromagnetic attacks, comprising:

a pulse transformer comprising:

a first sheet or layer based on magnetic ferrite powder, to be applied to at least one surface of the electronic system;

at least one transmission coil and at least one reception coil encircling a first area and a second area of the first ferrite sheet or layer, respectively, the first and second areas being separate from each other, a transmission stage connected to the transmission coil and configured to transmit pulses of electrical current to said transmission coil, a reception stage connected to the reception coil and configured to detect at least the peak amplitude of the electrical voltage generated by the electromagnetic force across the terminals of the reception coil, a microcontroller comprising:

at least one input-output, connected to the transmission stage with a view to triggering the pulses, an analog-digital converter, which is connected to the reception stage with a view to informing the electronic system and/or another microcontroller, via a bus, of variations in the peak amplitude across the terminals of the reception coil.

Advantageously, the first ferrite sheet or layer is made of an alloy of iron oxide, preferably chosen from $Fe_2(Ni_{1-x}Zn_x)O_4$ and $Fe_2(Mn_{1-x}Zn_x)O_4$.

Also advantageously, the first ferrite sheet or layer has a complex magnetic permeability ($\mu r=\mu'-j\mu''$) with $j^2=-1$, $\mu'$ being higher than 1, and typically comprised between 40 and 125, up to at least a frequency equal to 1 kHz and preferably up to at least 10 MHz, and $\mu''$ being lower than 1 up to at least a frequency of 1 kHz and preferably up to at least 10 MHz.

Preferably, the thickness of the first ferrite sheet or layer is comprised between 50 nm and 500 µm.

Also preferably, the magnetic ferrite powder of the first sheet or layer has a relative magnetic permeability µr the variation in which is smaller than 1% in a temperature range comprising at least the operating temperature range of the electronic system.

The temperature range may be comprised between 0° C. and 70° C. when the electronic system is intended for commercial applications, or between −40° C. and 85° C. when the electronic system is intended for industrial applications, or between −55° C. and 125° C. when the electronic system is intended for military applications.

According to one advantageous variant embodiment, the reception coil comprises a number of turns higher than that of the transmission coil. This allows a step-up voltage-transformer effect to be created, in case of high magnetic loss and/or large transfer distance.

Advantageously, the transmission coil comprises a number of turns comprised between 1 and 10, and preferably 2 to 3 turns.

Also advantageously, the reception coil comprises a number of turns comprised between 1 and 10, and preferably 2 to 5 turns.

According to one advantageous embodiment, the device comprises a second ferrite-based sheet or layer that is stacked on top of the first ferrite sheet or layer, and that is not encircled by the transmission and reception coils. With this second ferrite sheet/layer, the radiation due to the first ferrite sheet/layer is also decreased, this second sheet/layer providing a magnetic shield that limits the range of the jamming field and that limits exposure to the magnetic fields induced by the device according to the invention. This second sheet/layer, which plays the role of a passive electromagnetic shield, may itself be covered with an electrically conductive metal sheet/layer that even further enhances the shielding of the device according to the invention.

Preferably, the thickness of this second ferrite sheet or layer is comprised between 50 µm and 500 µm.

According to a first advantageous embodiment, the reception stage comprises, by way of means for detecting the peak amplitude across the terminals of the reception coil, at least a rectifier diode, a capacitor and a means for discharging the capacitor. This first variant is preferably implemented if the electromotive force generated by the transient flux across the terminals of the reception coil exceeds the knee voltage of a Schottky diode.

Advantageously, the means for discharging the capacitor is a resistor or an n-channel MOSFET short-circuiting the capacitor.

According to an advantageous second variant embodiment, the reception stage comprises, by way of means for detecting the peak amplitude across the terminals of the reception coil, an operational amplifier configured to act as a peak detector. This second variant is preferably implemented if the increase in transmission-coil voltage is low and the input current pulse low, the magnetic flux generated in the ferrite then possibly also being low.

According to one advantageous embodiment, the device further comprises at least one film of piezoelectric or pyroelectric material that is polarized in the direction of its thickness, said film being arranged above or below the first ferrite sheet or layer, the reception stage furthermore being configured to detect the peak amplitude of the voltage generated across the terminals of the film of piezoelectric or pyroelectric material, and the microcontroller further comprising an analog-digital converter connected to the reception stage with a view to informing the electronic system and/or the other microcontroller, via a bus, of variations in the peak amplitude across the terminals of the film of piezoelectric or pyroelectric material.

Preferably, the film of piezoelectric or pyroelectric material is a film of polyvinylidene fluoride (PVDF) with metallized main faces forming electrodes.

According to this embodiment, and a first variant, the reception stage advantageously comprises, by way of means for detecting the peak amplitude across the terminals of the film of piezoelectric or pyroelectric material, at least a rectifier diode, a capacitor and a means for discharging the capacitor.

Preferably, the means for discharging the capacitor is a resistor or an n-channel MOSFET short-circuiting the capacitor.

According to this embodiment, and a second variant, the reception stage comprises, by way of means for detecting the peak amplitude of the voltage generated across the terminals of the film of piezoelectric or pyroelectric material, an operational amplifier configured to act as a peak detector.

Thus, with at least one film of piezoelectric or pyroelectric material, the device according to the invention furthermore forms a detector of laser shots fired with a view to injecting optical faults. The thin and supple pyroelectric/piezoelectric film of a few tens of microns in thickness forms a thin sensor that has a low intrinsic capacitance, which sensor is connected in parallel with the reception coil or kept isolated from the reception coil and given its own peak-detecting operational amplifier, or its own rectifier diode and reservoir capacitor.

Advantageously, the one or more buses for informing the electronic system and/or the other microcontroller being one or more I2C or UART buses, the security of which is preferably ensured by means of a symmetric encryption algorithm (SEA).

According to yet another advantageous embodiment, the microcontroller comprises two separate input-outputs (Oi, Ob) connected to the transmission stage, one (Oi) being dedicated to triggering pulses for monitoring the integrity of the ferrite sheet or layer, the other (Ob) being dedicated to triggering electromagnetic jamming pulses. This allows the consumption of current to be optimized, mechanical and thermal attacks to be detected and disadvantageous effects resulting from the radiation due to the device according to the invention to be decreased.

According to this other embodiment, the microcontroller preferably further comprises a randomly activated pulse-width modulator for making the widths of jamming pulses emitted by the transmission stage vary randomly.

According to another advantageous embodiment, the ferrite sheet or layer with the transmission and reception coils are borne by a flexible, and preferably adhesive, carrier that is to be applied against the surface of the electronic system, the device further comprising an electrical battery for powering the microcontroller, said battery being connected to a voltage regulator, preferably a low-dropout (LDO) voltage regulator, that is configured to regulate the voltage of the battery to a stable voltage (Vcc), the microcontroller further comprising an analog-digital converter for managing battery charge (CANvb). Thus, a stand-alone device that may be installed in any electronic system to be protected, whether new or existing, is obtained.

According to another advantageous embodiment, the device further comprises a photodetector, the light-level threshold of which characterizes the openness of a package in which the electronic system is located. This photodetector thus allows information to be obtained on an increase in ambient light level corresponding to desired or undesired opening of a package in which the electronic system to be protected is located. In case of break in, detection of any exceeded light-level threshold may allow an alarm to be triggered.

Another subject of the invention is a method for protecting and supervising an electronic system, comprising the following steps:

a/ providing the protective device such as described above, this including applying the sheet or layer based on magnetic ferrite powder to at least one surface of the electronic system, b/ calibrating the device by taking a first measurement of the peak amplitude across the terminals of the reception coil in order to determine a reference value;

c/ once the calibration has been carried out, triggering at least one hardware interrupt on the input-output (I/O) so as to detect the value of the effective peak amplitude and to compare it to the reference value;

d/ if the comparison in step c/ between the effective value and the reference value corresponds to an attack situation then warning the electronic system and/or another microcontroller, step c/ consisting in repeatedly carrying out again and again hardware interrupts, the microcontroller being configured so that the current pulses transmitted by the transmission stage of the device are jamming pulses, the repetition rate of the jamming pulses being random, preferably at a value close to or submultiple close to the clock frequency of the electronic system to be supervised, the intensity of the jamming pulses having at least two values, one of which, which is intended to saturate any attacking electronic circuit, is higher than the intensity of the radiation of the system to be supervised and the other of which is substantially equal to the intensity of the radiation of the system to be supervised.

Thus, the invention essentially consists in a device for protecting an electronic system, such as an integrated circuit, said device incorporating a pulse transformer comprising a ferrite sheet or layer with low magnetic losses that covers a surface of the electronic system and that is encircled by two coils that are located a distance away from each other, one of these coils, the transmission coil, being connected to a transmission stage for transmitting electrical pulses, and the other of these coils, the reception coil, being connected to a reception stage, the whole thing being connected to and controlled by a microcontroller.

The ferrite sheet may preferably be applied by adhesive bonding.

The ferrite layer results from a deposition of ferrite particles of variable density.

Thus, at least two alternative modes of integration may be envisioned:

either a substrate with an adhesive base coated with a ferrite sheet or layer, which forms a product as such to be applied;

or ferromagnetic deposition of a layer the density and thickness of which are set depending on the sensitivity of the target application of the protective device.

The ferromagnetic nature of the ferrite allows it to guarantee the integrity of the protection, by ensuring the continuity of the electromagnetic field between the transmission-reception coils.

In addition, the fact that the ferrite is not electrically conductive has the advantage, when it is deposited directly in the form of a layer, of protecting the bondings, in contrast to a copper or silver layer, as in the prior art, which requires an additional resin layer to be deposited to avoid short-circuits.

In the context of the invention, the microcontroller may be an independent microcontroller or a microcontroller specific to the electronic system to be protected and supervised. Two microcontrollers may be merged into one and the same microcontroller, which controls the supervising process. Nevertheless, on account of the increased complexity of the security technique, it may be envisioned to place a third microcontroller in charge of managing jamming strategy, integrity monitoring, supervision of the supply of power because these functions may prove to be costly in terms of machine time. The major advantage of delegating supervision to a dedicated microcontroller is that integration into an existing electronic system is then possible without substantial modifications.

The sheet or layer is based on sintered ferrite powder and takes the form of a magnetizable, stiff and thin sheet or layer of low coercivity that is optionally friable or brittle, that is able to channel a broadband magnetic flux through its thickness, and one of the faces of which is preferably coated with an adhesive so that it may be adhesively bonded directly to the electronic system to be protected. By "broadband" what is meant here, and in the context of the invention, is frequencies that may typically reach 10 MHz and up to 50 to 100 MHz for ferrites having the lowest losses.

The area of the ferrite sheet or layer is preferably equal to the area of the upper face of the system to be protected, and typically of the order of one square centimeter, and its thickness is typically smaller than 0.5 mm. Tests carried out by the inventors have shown the effectiveness of the ferrite sheet or layer starting from 200 µm of ferromagnetic thickness.

Ferrite sheets or layers intrinsically have a high electrical resistivity and ferrite grains that may be relatively discontiguous while nonetheless retaining a significant shielding effect.

With metal shields according to the prior art, it is preferable for electrical conductivity to be maximal, in order to guarantee a sufficient attenuation of incident electromagnetic fields passing through a shield, this attenuation nevertheless depending on working frequency and on the skin thickness that results therefrom.

In contrast, the inventors have observed that one of the particularities of broadband ferrite powders based on alloys of soft-iron oxide is that the spatial extent of the shielding created by a ferrite grain is much larger than the size of this grain and that it is possible to produce polymer resins filled with ferrite grains that produce a significant attenuation or achieve significant channeling of a magnetic flux despite the dispersion of the ferrite grains in the polymer resin.

Based on this observation, the inventors have envisioned shielding layers fillable to a greater or lesser extent with preferably sintered ferrite powder on an adhesive layer that would allow broadband flux-channeling pulse transformers with controlled magnetic losses to be produced.

One advantageous embodiment corresponds to the case where the ferrite grains, in general of a characteristic unit dimension comprised between 50 and 300 μm, are made contiguous by high-temperature sintering and then form a thin, rigid, friable and brittle sheet or layer.

Such a ferrite sheet or layer is advantageously employed in the device according to the invention by way of integrity-monitoring means, because a crack is enough for the magnetic flux transferred through the thickness of the sheet or layer to be notably decreased and for a physical aggression or an attempt to remove the device once applied (adhesively bonded) to the electronic system to be protected to be characterized.

Generally, each current pulse generates a transient magnetic flux that is transferred from the transmission coil to the reception coil, through the ferrite sheet or layer. Specifically, the low losses of the ferrite sheet or layer allow the magnetic flux to be transferred over a distance that is large enough to cover the entire area of the electronic system to be protected, and to make said flux detectable from one end of the surface to the other.

The existence of the losses allows, using a differential method, an attack probe placed above the ferrite sheet or layer to be located, said probe generating a signal of different amplitude depending on which of the two coils it is closer to. The closer the attack probe is to one of the coils, the higher the electromotive force generated across the terminals of the coil, and hence it is possible to determine a relationship between a voltage difference between the two coils and the position of the attack probe.

The electromotive force that appears across the terminals of the reception coil is processed by the reception stage, the function of which is mainly to deliver the peak amplitude of the signal across the terminals of the reception coil to an analog-digital converter of the microcontroller.

The electronic system is informed via a bus when a significant disruption of the peak amplitude is detected.

Furthermore, specific jamming pulses may be injected into the ferrite sheet or layer.

Generally, dangerous attack voltages, i.e. voltages liable to cause faults in an electronic system to be protected, produce output voltages that are much higher than those measured across the terminals of the reception coil during supervised operation. There is therefore no scope for detection errors.

In other words, the device according to the invention is able, where appropriate taking into account temperature, to distinguish between a normal peak amplitude corresponding to an expected value across the output terminals of the reception stage and a peak amplitude of an output signal in an attack situation.

In case of a fault-injection attack, the device according to the invention is able to trigger a microcontroller hardware interrupt, which will optionally be encrypted for security reasons, so as to inform the electronic system to be protected.

The jamming pulses produced in sensitive phases, optionally with decoys, may be configured accordingly and the electronic system to be protected may also modify its procedures according to a strategy that is specific thereto.

Contrary to prior-art solutions, the device according to the invention and the associated supervising method allow not only the electronic system to be shielded, but also the integrity of the electronic system on the one hand and of the device itself on the other hand to be monitored, and active electromagnetic jamming to be carried out.

Active monitoring in particular allows the presence of a ferrite-based attack probe to be detected, and fault-injection attacks to be detected. It is in particular possible to detect the increases in voltage caused by an attack device comprising inductive turns oriented, even if only very partially, along the axis of maximum sensitivity of the device.

Jamming allows side-channel attacks to be warded off.

In one advantageous embodiment, the addition of a film of piezoelectric or pyroelectric material above or below the ferrite sheet or layer allows additional protective functionalities to be given to the device according to the invention.

Thus, in case of a laser-based attack or an attack based on a static or vibrational point mechanical stress or based on a pyroelectric shock, an electromotive force appears across the terminals of the film and is detected in order to inform the electronic system to be protected and/or another microcontroller.

Some of the many advantages of the invention are:
the following functionalities are combined in a single device: shielding, monitoring of the integrity both of the electronic system to be protected and of the device itself, electromagnetic jamming against untimely attempts to listen in, and advantageously protection against attacks employing a laser or thermal and mechanical shocks, or indeed against attempts to break into the package housing the electronic system;
the device according to the invention is highly compact, the pulse transformer of the proposed solution in particular having small dimensions relative to the electronic system to be protected;
a low electrical power consumption, allowing continuous autonomous supervision even when the electronic system to be protected is turned off,
a low number of transmission/reception pins are required for operation;
monitoring/supervision is rapid;
the device according to the invention may be sold in the form of a stand-alone piece of equipment the pulse transformer of which (ferrite sheet or layer encircled by the transmission and reception coils) may preferably be applied by adhesive bonding, easily and rapidly, to a new electronic system or to an existing system or to the package of such a system.

Other advantages and features will emerge more clearly on reading the detailed description, which is given by way of non-limiting illustration, with reference to the following figures.

DETAILED DESCRIPTION

Figure 1:
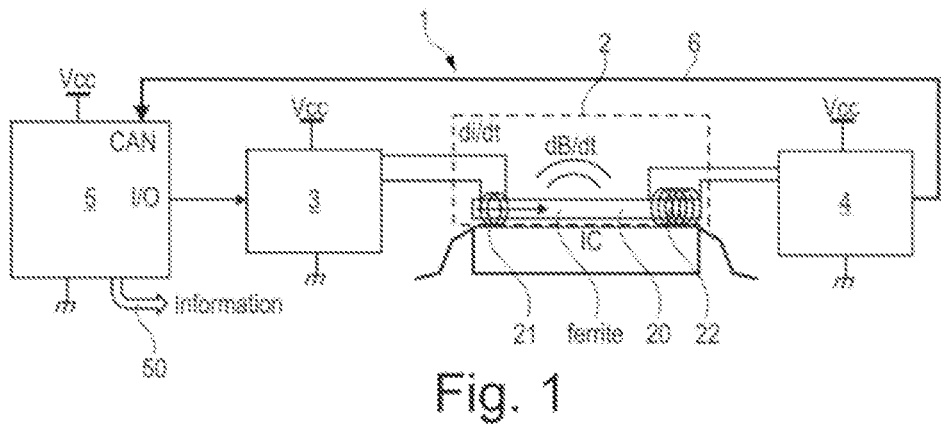
FIG. 1 is a schematic representation showing an example of a device for protecting and supervising an integrated circuit, according to the invention.

FIG. 1 shows an example of a device 1 for protecting and supervising an integrated circuit (IC) to be protected. As detailed below, such a device allows not only the system to be shielded, but also the integrity of the integrated circuit and of the device itself to be simultaneously monitored and jamming to be carried out.

The device firstly comprises a pulse transformer 2 formed from a sheet or layer 20 based on magnetic ferrite powder, from a transmission coil 21 and from a reception coil 22 that is located a distance away from the transmission coil.

The coils 21, 22 each encircle an area of the ferrite sheet or layer 20 at one of its longitudinal ends.

Preferably, the magnetic ferrite sheet or layer 20 has a thickness comprised between 50 and 500 µm, and is made of an alloy of iron oxide, and has a complex magnetic permeability ($\mu r=\mu'-j\mu''$) with $j^2=-1$, $\mu'$ being higher than 1, and typically comprised between 40 and 125, up to at least a frequency equal to 1 kHz and preferably up to at least 10 MHz, and $\mu''$ being lower than 1 up to at least a frequency of 1 kHz and preferably up to at least 10 MHz.

The reception coil 22 preferably has more turns than the transmission coil 21. This allows high magnetic losses and/or large transfer distances to be compensated for by creating, so to speak, a step-up voltage transformer. Typically, the transmission coil 21 is made up by a number of two turns, whereas the reception coil 22 has four turns.

The ferrite sheet or layer 20 is adhesively bonded directly to or deposited directly on the upper surface of the integrated circuit (IC) to be protected.

The transmission coil 21 is connected to a transmission stage 3 that is configured to transmit pulses of electrical current.

The reception coil 22 is for its part connected to a reception stage 4 that is configured to detect at least the peak amplitude of the electrical voltage generated by the electromagnetic force across the terminals of the reception coil 22.

The device 1 further comprises a microcontroller 5 comprising at least an input-output (I/O) connected to the transmission stage 3 and an analog-digital converter (CAN) connected to the reception stage 4.

The device works as follows.

The input-output (I/O) triggers the transmission of current pulses from the transmission stage 3 to the transmission coil 21. The transmitted pulses are preferably generated regularly and randomly.

A current pulse generates a transient magnetic flux that is transferred to the reception coil 22 through the ferrite sheet or layer 20.

The electromotive force that appears across the terminals of the reception coil 22 is detected by the reception stage 4 in order to deliver the peak amplitude of the signal transmitted from the reception coil 22 to the analog-digital converter CAN via a hardware port 6.

When significant variations in the peak amplitude are detected, an alarm may be triggered and the integrated circuit (IC) informed by the microcontroller 5 via a bus 50.

The bus 50 is preferably an I2C bus, i.e. a half-duplex bidirectional synchronous serial bus.

The significant variations in peak amplitude may firstly be generated by any defect in the integrity of the ferrite sheet or layer. Specifically, since the latter is friable, as soon as a micro-crack is generated by an attempt to debond the device, a decrease in the magnetic flux is generated and, thereby, the peak amplitude of the output signal, i.e. the signal across the terminals of the reception coil 22, is decreased.

Furthermore, during an attack based on injection of electromagnetic faults using an attack probe the magnetic flux of said probe will be coupled to the ferrite sheet or layer 20, and this will generate substantial variations in the signal in the reception coil 22.

Moreover, activation of a high transient magnetic flux within the ferrite sheet or layer 20 causes jamming of any device for listening into the electrical activity of the integrated circuit (IC) and prevents such a device from being able to compromise the security of the integrated circuit (IC), and in particular its encryption keys.

A main rechargeable battery allows the device 1 according to the invention to operate autonomously. A standby battery or decoupling capacitors of sufficiently high capacitance may be provided so that, in case of failure or abrupt disconnection of the main battery, a main-battery-voltage fault message is activated.

Figure 2:
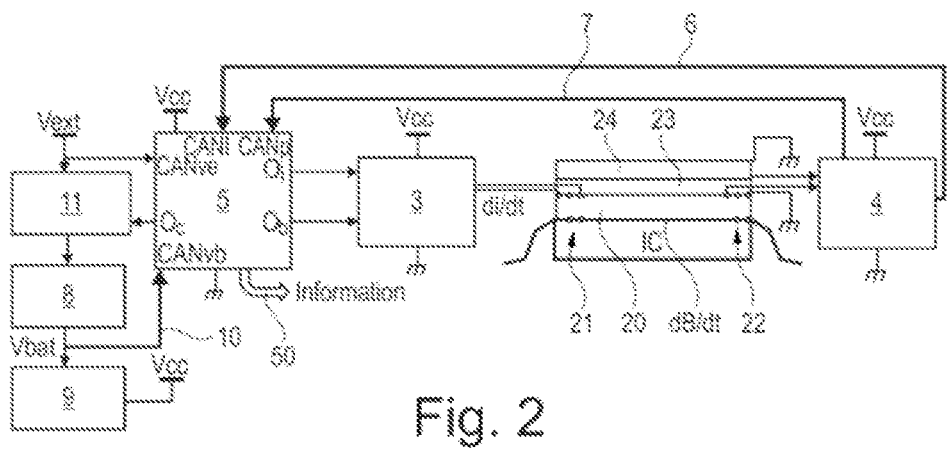
FIG. 2 is a schematic representation showing a device incorporating a plurality of advantageous embodiments.

FIG. 2 shows a device 1 that has been improved, in order to decrease effects induced by its own radiation, to optimize current consumption, and to allow laser-based, mechanical and/or thermal attacks to be detected.

Firstly, an additional ferrite sheet or layer 23 is stacked on top of the ferrite sheet or layer 20 when it is desired to limit the radiation due to the latter. Thus, magnetic shielding that limits the range of the jamming field and that limits exposure to the magnetic field induced by the pulse transformer 2 is obtained. This additional ferrite sheet or layer 23 may itself be covered with an electrically conductive metal sheet or layer that further enhances the electromagnetic shielding.

Moreover, a film 24 of piezoelectric or pyroelectric material that is polarized in the direction of its thickness is arranged above or below the ferrite sheet or layer 20. The film 24 may be a film of PVDF (polyvinylidene fluoride) with its two main faces metallized. Furthermore, this film 24 complements the magnetic shielding of the device 1 with shielding due to electrical conduction.

As shown in FIG. 2, the film 24 is preferably arranged above the ferrite sheet or layer 20 so that its metallized faces limit the range of the electromagnetic jamming field generated by the ferrite sheet or layer 20.

This film 24 forms a means for detecting an attack employing laser pulses or a thermal shock, or a mechanical attack.

To this end, the wire 24 is connected to the reception stage 4, which is able to detect the peak amplitude of the voltage generated across the terminals of the film 24 of piezoelectric or pyroelectric material, and the microcontroller 5 is equipped with an additional analog-digital converter (CANp), which is connected to the reception stage via an additional hardware port 7. The architecture of the reception stage 4, as regards this detection, is the same as for detection of the peak amplitude across the terminals of the reception coil 22, as explained below with reference to a detailed example of FIG. 3.

The electronic system to be protected is therefore also informed, via the bus 50, of variations in the peak amplitude across the terminals of the film of piezoelectric or pyroelectric material.

Another improvement to the device consists in separating the functions required for the supervision, i.e. to monitor the integrity of the ferrite sheet or layer 20 and therefore of the integrated circuit to be protected, on the one hand, and for the jamming, on the other hand.

To this end, in the microcontroller 5, an additional input-output is provided: thus, as symbolized in FIG. 2, the input-output Oi allows integrity-verifying pulses to be generated, whereas the input-output Ob is dedicated to the generation of jamming pulses. This additional input-output Ob also allows the electrical power consumption required to perform this jamming function to be decreased.

All the improvements to the device 1 that were summarized above and that have been illustrated in FIG. 2 make the device more complex and more expensive, but allow it to better meet standards for protection against nonionizing radiation, when such is required.

An additional improvement to the device 1 according to the invention consists in providing means for continuously supplying it with electrical power, making it autonomous powerwise so as to not allow it to be removed and neutralized when it is off-line.

To this end, the device 1 firstly comprises a main battery 8 the voltage Vbat of which is regulated to a stable supply voltage (Vcc) by means of a voltage regulator 9, typically a low-dropout (LDO) regulator. The stable supply is delivered by means of a port 10, to an analog-digital converter (CANvb) that is integrated into the microcontroller 5 and therefore dedicated to management of battery charge. The battery voltage (Vbat) normally decreases slowly with consumed current, except in case of attack of the battery wire. In this case, a battery-voltage-fault alarm is activated and the circuit (IC) to be protected may be informed.

The microcontroller 5 also supervises faults regarding the battery voltage (Vbat) and charging and discharging thereof, depending on an available exterior voltage (Vext), which is delivered to the battery charger 11. This occurs when a source of exterior voltage (Vext) is plugged in and detected by a dedicated analog-digital converter (CANve) in the microcontroller 5. Furthermore, an input-output (Oc) dedicated to the charger 11 is provided in the microcontroller 5.

The stable (regulated) voltage (Vcc) is achieved using decoupling capacitors the capacitance of which is sufficiently high that the duration of the period over which the battery voltage (Vbat) is monitored is shorter than the time taken for the regulated voltage to discharge once the wire used to supply the battery voltage to the regulator 9 has been cut. In this case, in case of a fault in the battery voltage, a battery-voltage-fault alarm message is activated.

Figure 3:
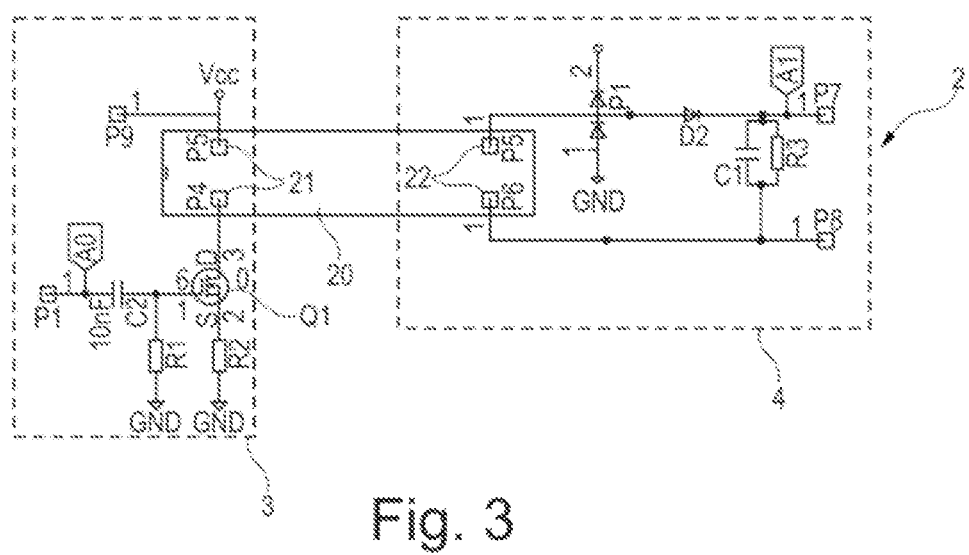
FIG. 3 is a circuit diagram showing the various electrical components of an example of a device according to the invention without its microcontroller.

With reference to FIG. 3, one advantageous example of embodiment of the electrical circuit of a device 1 according to the invention without its microcontroller 5 will now be described.

In this diagram it will be noted that the symbol "Vcc" corresponds to the delivered stable electrical supply, "GND" designates the ground of the electrical circuit of the device, "P1" to "P9" are electrical connection pins, "A0" is the input voltage across the terminals of the transmission stage 3, "A0" corresponds to the signal delivered via the input-output (I/O) of the microcontroller 5, and "A1" is the output voltage across the terminals of the reception stage 4.

In the indicated example, the ferrite sheet or layer 20 is a 200 μm thick sheet or layer already sold under the sales reference MSLL12060-000 by the company LAIRD, with a 75 μm thick adhesive that has a peelable protective sheet or layer, the adhesive being deposited on one of the faces of the ferrite sheet or layer.

The transmission coil 21 and the reception coil 22 are each made up of 2 or 3 turns of an enamel-coated copper wire of 40 μm diameter. The turns of the transmission coil 21 and of the reception coil 22 encircle the ferrite sheet or layer 20 at a few millimeters distance, at each longitudinal end of the sheet or layer 20, respectively.

To generate a transmission of a transient magnetic flux to the transmission stage 3, a control logic pulse is delivered via an input-output pin I/O of the microcontroller 5, said pin being programmed to act as an output.

This pulse is applied to the gate of an n-channel MOSFET Q1 after having undergone high-pass filtering that is achieved via two passive components, a capacitor C2 and a resistor R1. This high-pass filtering acts as a safety device in that it limits the time for which the transistor Q1 is turned on and absorbs a high current (this current may be as high as several amps).

The drain of the transistor Q1 is connected to one of the pins P4 of the transmission coil 21, whereas the other pin P3 of the coil is connected directly to the supply voltage Vcc. A large variation in current is then generated in the transmission coil 21 when the transistor Q1 is opened and closed to start and end the pulse, this generating a transient magnetic flux in the ferrite sheet or layer 20. This large variation in current of a few nanoseconds generates a notable additional voltage in the transmission coil 21. This additional voltage may reach 20 volts and has the advantage that the rectifier diode D2 and the reservoir capacitor C1 of the reception stage 4 may be used for passive peak-amplitude detection, as detailed below, without an amplifier being required at the output of the reception coil 22.

The reception coil 22 receives the transient magnetic flux and produces an electromotive force that powers the reception stage 4.

If the additional voltage of the transmission coil 21 is low and the input pulse current is low, the magnetic flux delivered to the ferrite sheet or layer 20 may also be low, and in this case it may be envisioned to provide an output operational amplifier (not shown) configured to act as a peak detector. Although the use of such an operational amplifier increases the number of components and the complexity of the circuit, it has the advantage of limiting the magnitude of the transient flux required by the supervising and jamming functions of the device according to the invention and therefore limits the level of exposure to high-frequency fields.

In the contrary case, if the electromotive force generated by the transient flux across the terminals of the output coil exceeds the knee voltage of a Schottky diode, it is possible to use only two passive components, namely a rectifier diode D2 and a reservoir capacitor C1, as illustrated in FIG. 3, for peak detection.

Between the reception coil 22 and the rectifier diode D2, two protective diodes D1 are mounted in series, in order to limit the positive or negative reception overvoltages caused by induction-based attacks should there be any. Thus, by virtue of these two diodes D1, these overvoltages drain to the supply Vcc and to the ground of the circuit, respectively.

When the reception signal reaches a sufficient voltage value, higher than the knee voltage of the rectifier diode D2, a DC voltage appears across the terminals of the reservoir capacitor C1.

This capacitor C1 continually drains through a leakage resistor R3 the resistance of which is high enough that the discharge time is long with respect to the time taken to sample the voltage that appears across the terminals of the capacitor C1.

Typically, the time constant of discharge is of the order of one-hundred microseconds, whereas the time taken by the analog-digital converter (CAN, CANi) to sample and measure the voltage across the terminals of the capacitor is of the order of one microsecond. It is possible to decrease the discharge time of the capacitor by replacing the charging resistor R3 with an n-channel MOSFET (not shown) the source of which would be connected to ground and the drain of which would be connected to A1, its gate voltage being raised to a voltage higher than its threshold voltage for the time required to discharge the capacitor. This discharge time may thus be decreased to less than one microsecond. However, this has the drawback of requiring an additional control input-output (I/O).

The voltage A1 that appears across the terminals of the capacitor C1 is representative of the coupling between the transmission coil 21 and reception coil 22 and thus allows variations in the magnetic field B above the ferrite sheet or layer 20 to be sensed. This measurement is made via the analog-digital converter (CAN, CANi) of the microcontroller 5.

Figure 4:
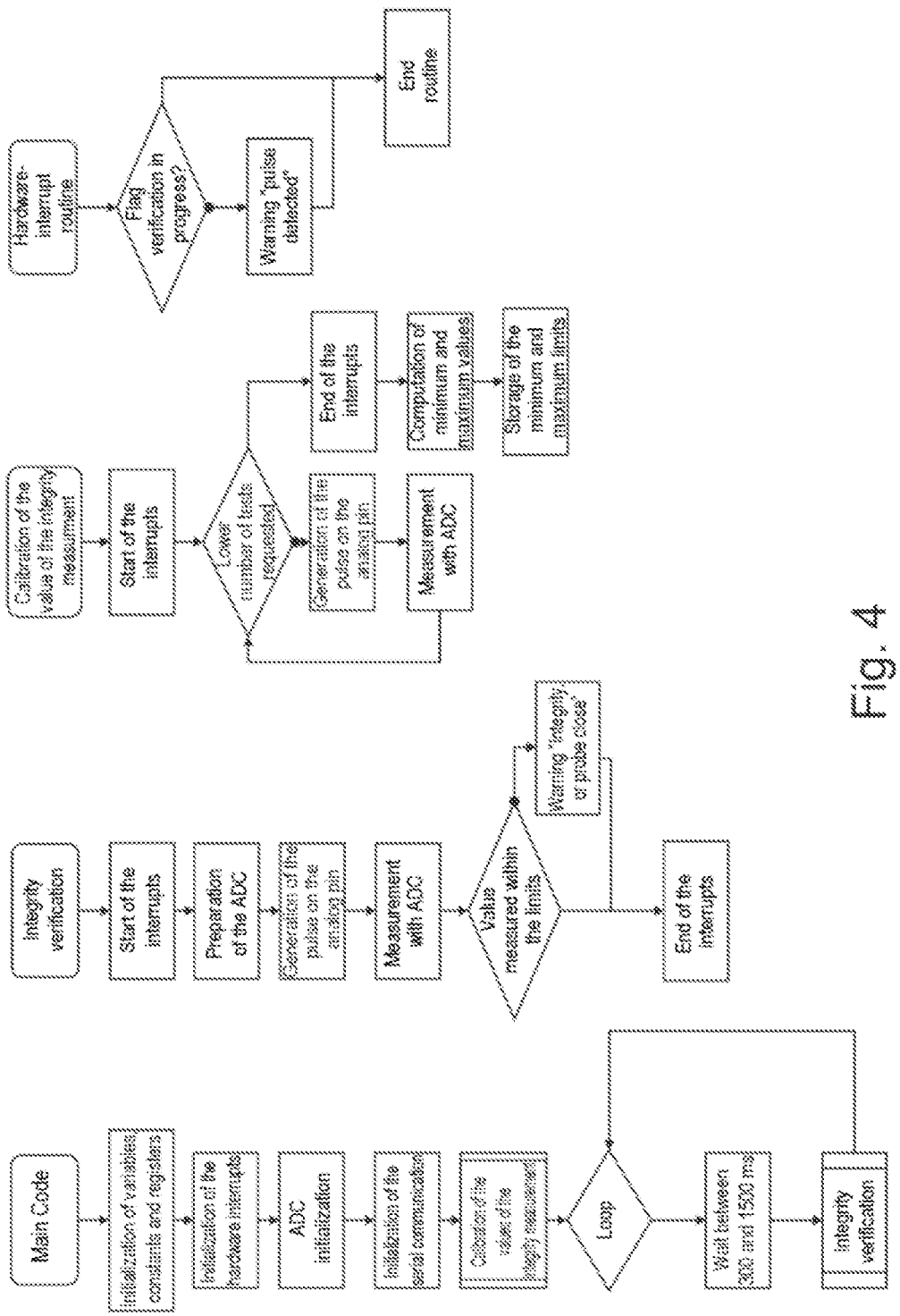
FIG. 4 is a block diagram of the sequences of the supervising method according to the invention such as implemented by the microcontroller of the device.

FIG. 4 is a block diagram of the program for monitoring the integrity of the ferrite sheet or layer 20 of the electrical circuit illustrated in FIG. 3 and for detecting injection of faults by induction.

This program consists in regularly verifying integrity, but at times that are randomly chosen and that may furthermore be very frequent in the electromagnetic jamming phase.

When an attack probe produces an output voltage across the terminals of the capacitor C1, a hardware-interrupt routine allows the peak amplitude of the electromagnetic pulse to be detected. This information may be managed directly by the integrated circuit (IC) to be protected, if it has a sufficient number of input-outputs and comprises a microcontroller. Here, in a way that is preferred, the microcontroller 5 of the device 1 is independent and the bus 50, of I2C type with advanced encryption (AES), allows secure communication with the circuit (IC) to be protected. In one variant, the I2C bus may be replaced by a preferably full-duplex UART bus.

As illustrated in FIG. 4, the main code executes with an initializing phase and an infinite loop. In the initializing phase, data, hardware interrupts, the analog-digital converter (CAN) and the serial link are declared.

Next, a calibrating phase starts with a first measurement of the output signal, which is recorded and which forms a reference value for the integrity test. This assumes that the device 1 is in a nominal electromagnetic environment on start-up. When the ferrite sheet or layer 20 is applied against the integrated circuit (IC) to be protected, the environment subjacent the ferrite is of a nature to modify the reference value in the supervising test. This calibrating phase is thus carried out for the very first time as soon as the ferrite sheet or layer 20 has been applied against the circuit (IC) to be protected, and the reference value is stored in memory.

A hardware-interrupt routine is started if voltage variations are detected in the reception coil 4.

If such a variation is detected but not following an integrity test, it is considered to result from an exterior disruption, i.e. from an electromagnetic pulse that is signaled as such.

The program then enters into a loop that verifies the integrity of the ferrite sheet or layer 20 regularly but with a random repetition delay and with a pulse width that defines the random current drawn by the transmission coil 21. This function consists in triggering hardware interrupts with a random time that triggers the pulse on the gate of the transistor Q1 and a measurement of the signal received across the terminals of the capacitor C1. This value is compared to the reference value stored in memory after the calibrating phase, in order to signal or not that the integrity of the device 1 has been compromised.

Figure 5:
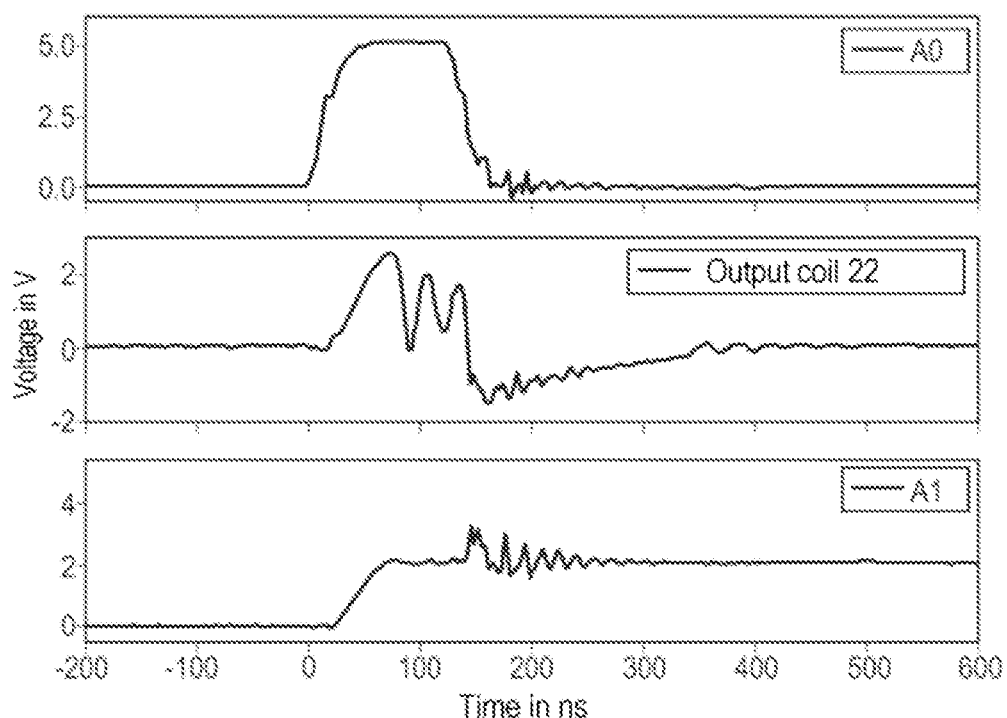
FIG. 5 illustrates, in the form of curves, the signals measured on the gate of the MOSFET of the transmission coil, at the reception coil and across the terminals of the capacitor of the reception stage of the device in FIG. 3, respectively.

FIG. 5 illustrates the signal (A0) that controls the gate voltage of the transistor Q1 of the transmission coil 3, the voltage across the terminals P5, P6 of the reception coil 4, and the signal (A1) across the terminals of the reservoir capacitor C1 sampled by the analog-digital converter (CAN, CANi) of the microcontroller 5, respectively.

It will be noted here that the microcontroller 5 used is sold under the denomination ATmega328.

It may be seen from these curves that, with respect to a voltage reference of 5 V, a signal of the order of 2.1 V is measured, the ATmega328 microcontroller 5 returning, on 10 bits, quantified numerical values comprised between 400 and 420 that are representative of the voltage of 2.1 V.

Figure 6:
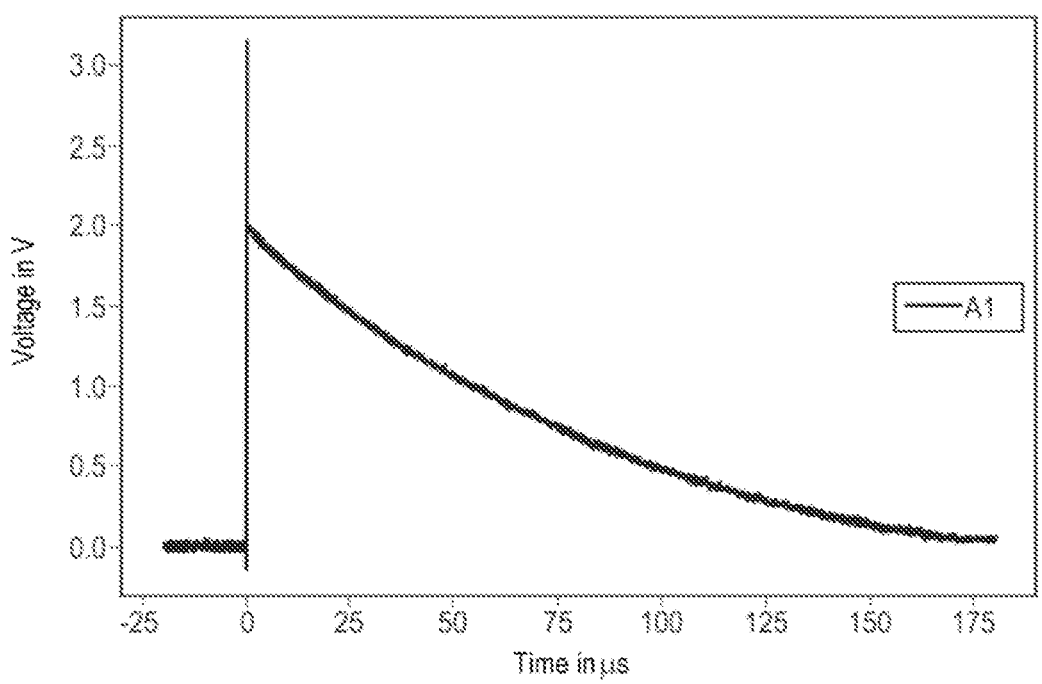
FIG. 6 illustrates, in curve form, the decrease as a function of time in the voltage across the terminals of the capacitor of the reception stage of the device in FIG. 3.

FIG. 6 shows the fall time, which is of the order of 100 μs, of the voltage across the terminals of the reservoir capacitor C1, after the transmission of an integrity-monitoring pulse. This time limits measurement rate. It may be envisioned to decrease this time by arranging, in the reception stage 4, a discharging transistor that short-circuits the capacitor C1.

The inventors have investigated the influence of the composition of the ferrite sheet or layer 20 on the signals received by the reception coil 4 and therefore on the detection of the sought peak amplitude.

To do this, they evaluated the losses generated by diluting ferrite powder in an insulating substrate. To this end, samples were prepared by mixing ferrite powder and very fluid single-component adhesive on the one hand, and ferrite powder and more viscous two-component epoxy resin on the other hand.

The results obtained with these samples were then compared to those obtained with a rigid, sintered ferrite sheet or layer coated with an adhesive. This rigid, ferrite sheet or layer was a sheet or layer sold under the reference MSLL12060-000 by the manufacturer LAIRD, initially intended for shielding and guiding field lines in near-field communication applications.

Two transmission and reception coils 21, 4, each of a number of three turns, were placed at the ends of a ferrite sample.

A square signal of amplitude equal to 1 V was injected into the transmission coil 21 and the signal received by the reception coil 22 was measured.

Figure 7:
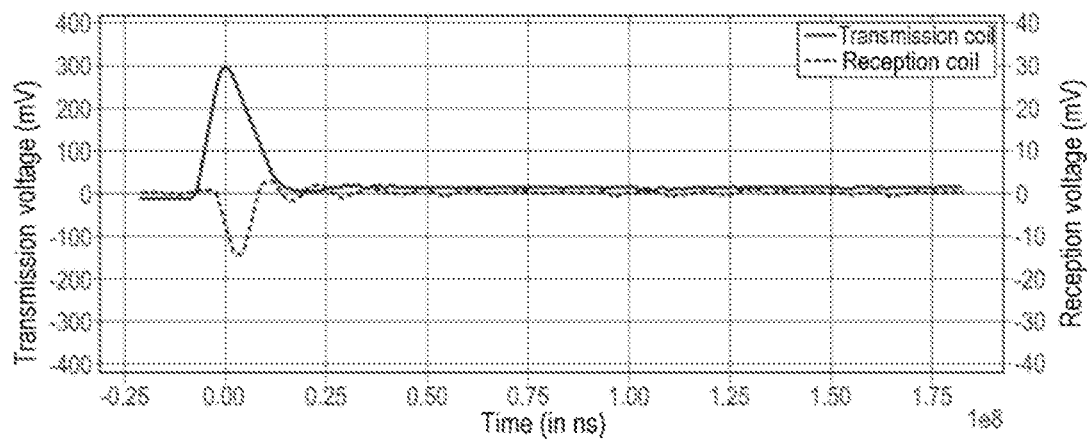
FIG. 7 illustrates, in the form of curves, the electrical signals at the transmission coil and at the reception coil of the pulse transformer of the device in FIG. 3, respectively, with a first example of a sheet based on ferrite powder.
Figure 8:
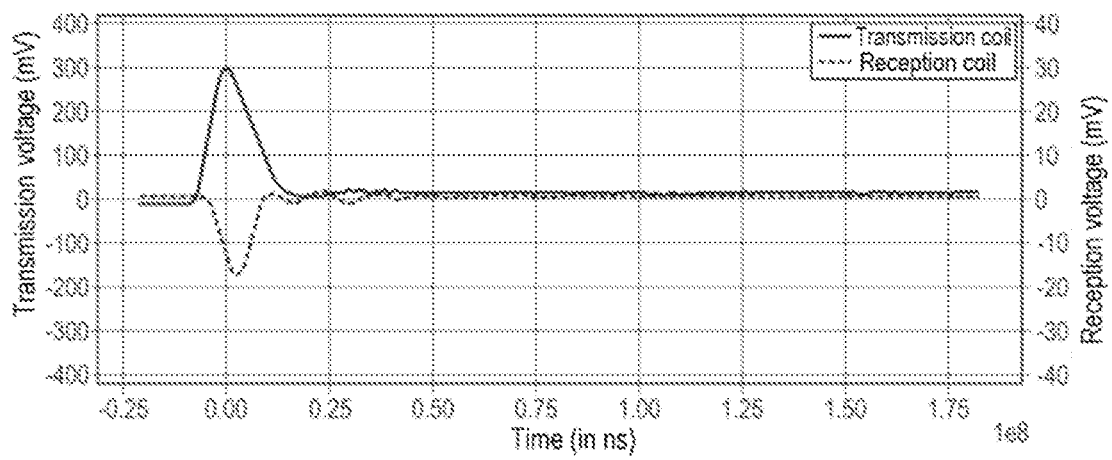
FIG. 8 illustrates, in the form of curves, the electrical signals at the transmission coil and at the reception coil of the pulse transformer of the device in FIG. 3, respectively, with a second example of a sheet based on ferrite powder.
Figure 9:
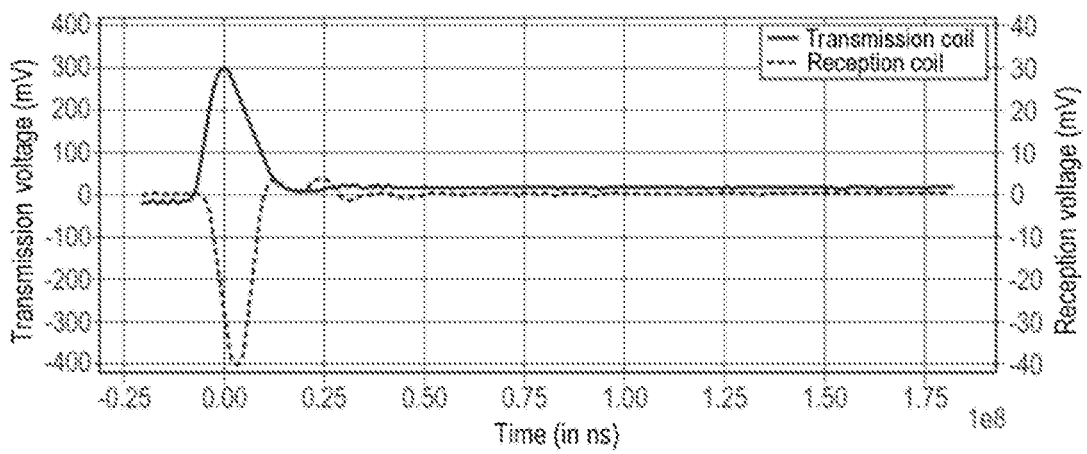
FIG. 9 illustrates, in the form of curves, the electrical signals at the transmission coil and at the reception coil of the pulse transformer of the device in FIG. 3, respectively, with a third example of a sheet based on ferrite powder.

FIGS. 7, 8 and 9 each show the electrical signal measured across the terminals of the transmission coil (solid lines) and reception coil (dashed lines), respectively, for the following respective samples:
- a mixture of an epoxy resin and of a broadband, type M, soft-ferrite powder of Ni—Zn alloy from the company National Magnetics with an initial permittivity gr equal to 40. The epoxy resin was relatively viscous, this decreasing the ability to increase the degree to which it may be filled with powder. The ferrite grains had a characteristic dimension of 125 µm.
- a mixture of a fluid adhesive sold under the denomination Loctite 407 (low viscosity and high temperature) and of a broadband, type M, ferrite powder of Ni—Zn alloy from the company National Magnetics with an initial permittivity gr equal to 40. The powder fill density was higher than that obtained with the sample employing epoxy resin, but lower than that of the rigid, sintered sheet or layer.
- a sintered, ferrite sheet or layer of 200 µm thickness deposited on an adhesive strip of 75 µm thickness.

Depending on the samples, voltage maxima of 12 mV, 20 mV and 35 mV were obtained, respectively. The sintered, ferrite sheet or layer deposited on the adhesive strip produced the strongest signal, as it was the densest in ferrite, the most rigid and the most brittle. The friable aspect of a sintered sheet or layer introduced a criterion of non-deformability once it was applied (adhesively bonded) to the electronic circuit to be protected.

Nevertheless, it may be seen that the two mixtures with epoxy resin and adhesive produce exploitable reception signals and are therefore potential variants as regards the ferrite sheet or layer 20 to be applied to an electronic circuit to be protected.

The inventors also evaluated the variation in the output voltage across the terminals of the capacitor C1 as a function of the state of degradation of a rigid, sintered ferrite sheet or layer 20.

Figure 10:
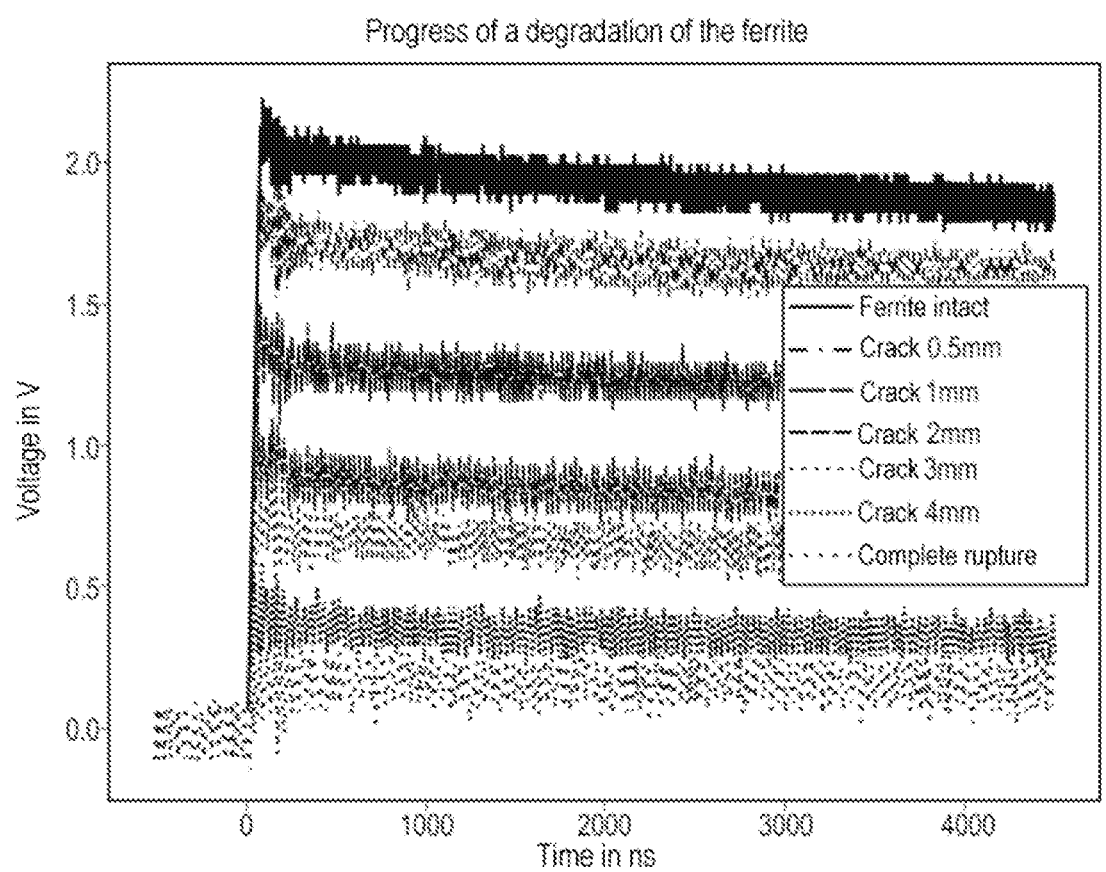
FIG. 10 illustrates, in the form of curves, the variation in the voltage across the terminals of the capacitor of the reception stage of the device in FIG. 3, as a function of the state of degradation of a ferrite sheet or layer according to the invention.
Figure 11:
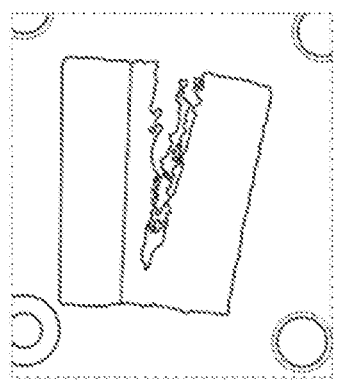
FIG. 11 is a photographic reproduction of a ferrite sheet or layer having undergone a complete rupture.

This variation is shown in FIG. 10. It may be seen that the drop in the output voltage increased as the notches in the ferrite sheet or layer 20 increased because they thus decreased the area of coupling of the flux between the transmission coil 3 and reception coil 4. In the case of a hole in/breakage of the ferrite, as shown in FIG. 11, the magnetic field is less well transmitted between the two coils 3, 4 and the voltage across the terminals of the coil is decreased. This clearly shows that the magnetic flux covers the entire area of the sintered, ferrite sheet or layer, and therefore would cover all of any subjacent electronic circuit to be protected.

This also proves that measurement of the peak amplitude of the signal output by the reception coil 4 allows somewhat advanced degradation of said sheet or layer 20 to be detected.

Figure 12:
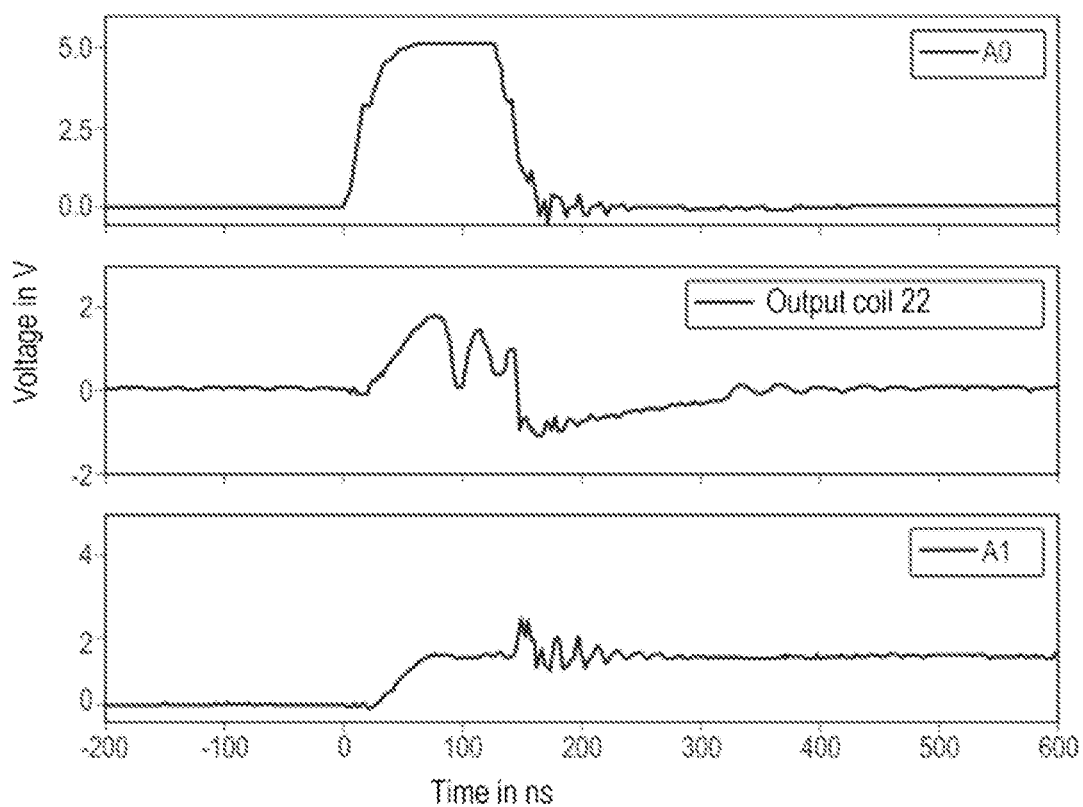
FIG. 12 illustrates, in the form of curves, the signals measured on the gate of the MOSFET of the transmission coil, at the reception coil and across the terminals of the capacitor of the reception stage of the device in FIG. 3, respectively, in the course of an attack employing an electromagnetic injection probe, during which attack no pulses were fired.

FIG. 12 illustrates the signal (A0) of the gate voltage of the transistor Q1 of the transmission coil 3, the voltage across the terminals P5, P6 of the reception coil 4, and the signal (A1) across the terminals of the reservoir capacitor C1 sampled by the analog-digital converter (CAN, CANi) of the microcontroller 5, respectively, following an attack based on bringing an electromagnetic injection probe into the proximity of the output of the reception coil 4, during which attack no pulses were fired.

The probe used consisted of a ferrite rod of 2 mm diameter made of the material sold by the company Fair-Rite under the denomination "67 material".

It may be seen that the signal across the terminals of the reception coil 4 exhibited a voltage lowered to about 1.4 V.

The approach of a near-field probe of the type sold under the denomination Langer RF2 U 5-2 is also effectively detected.

In contrast, the approach of a ferriteless near-field probe such as that sold under the denomination Langer RF3 B0, 3-3 is not detected.

All the integrity tests described above were carried out at room temperature (25° C.). Tests at various temperatures were carried out to inspect the operating range of the device 1 according to the invention.

Figure 13:
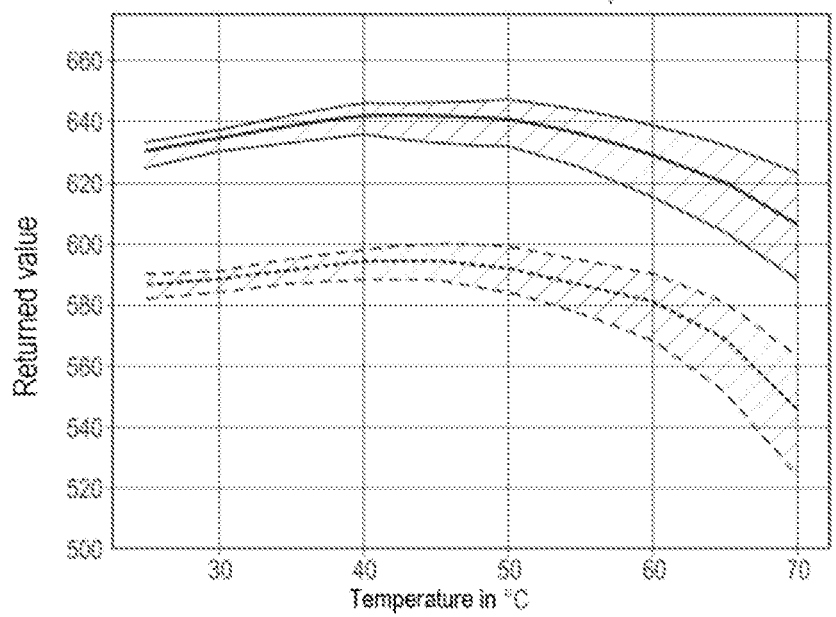
FIG. 13 illustrates, in the form of curves, the drift in the signals at the reception coil as a function of the temperature of the environment to which the ferrite sheet or layer is subjected.

FIG. 13 illustrates the limit of detection of the presence of a ferrite-containing attack probe as a function of temperature. More precisely, this FIG. 13 gives the output values returned by the converter (CAN) of the microcontroller 5 as a function of the temperature to which the device 1 is subjected. It will be noted that, for this test, the number of turns of the reception coil 4 was increased, and hence the quantification of the peak amplitude of the output signal had a nominal value quantified on 10 bits equal to 630.

The solid line represents the distribution of the signal as a function of temperature in a normal operating situation, i.e. without attack, whereas the dotted line represents the distribution of the signal in the presence of an attack probe. The attack probe consisted of a five-turn ferrite rod of 2 mm diameter made of the material sold by the company Fair-Rite under the denomination "67 material". No pulses were fired, the probe just being brought into contact with the top of the ferrite sheet or layer.

From FIG. 13 it will firstly be noted that although temperature had an influence, it was small, the resultant variation being of the order of a few percent and monotonic over a quite large temperature range.

It will also be noted that it was possible to sense the presence of an attack probe up to a certain temperature located in the vicinity of 65° C. Therebeyond, the supervising system was no longer sufficiently sensitive, with a single acquisition and without computing an average value.

In contrast, when a temperature correction was applied and an average value computed over about one-hundred measurements, which required no longer than 10 ms, then it was entirely possible to continue to sense the presence of the ferrite-containing attack probe up to temperatures at least as high as those acceptable by the electronic circuit to be protected.

Therefore, FIG. 13 shows that the supervising device according to the invention may remain effective over the entire operating temperature range of the integrated circuit (IC) to be protected. Although the ferrite used for the test was entirely satisfactory, the sheet or layer 20 of the device will possibly advantageously be made from ferrites the magnetic properties of which vary little, typically less than 1%, in conventional operating temperature ranges, i.e. between 0° C. and 70° C. for commercial applications, between −40° C. and 85° C. for industrial applications, and between −55° C. and 125° C. for military applications.

To validate the effect of the passive shielding due to the presence of a ferrite sheet or layer, the inventors carried out tests in which a sintered, ferrite sheet or layer was applied to an ATMega microcontroller manipulating registers, by way of electronic component to be protected. The inventors observed beforehand that it was possible to generate faults in this electronic component using a value of 100 V when the component was not protected and when an injection-coil attack probe was placed 3 mm above its packaging.

Figure 14:
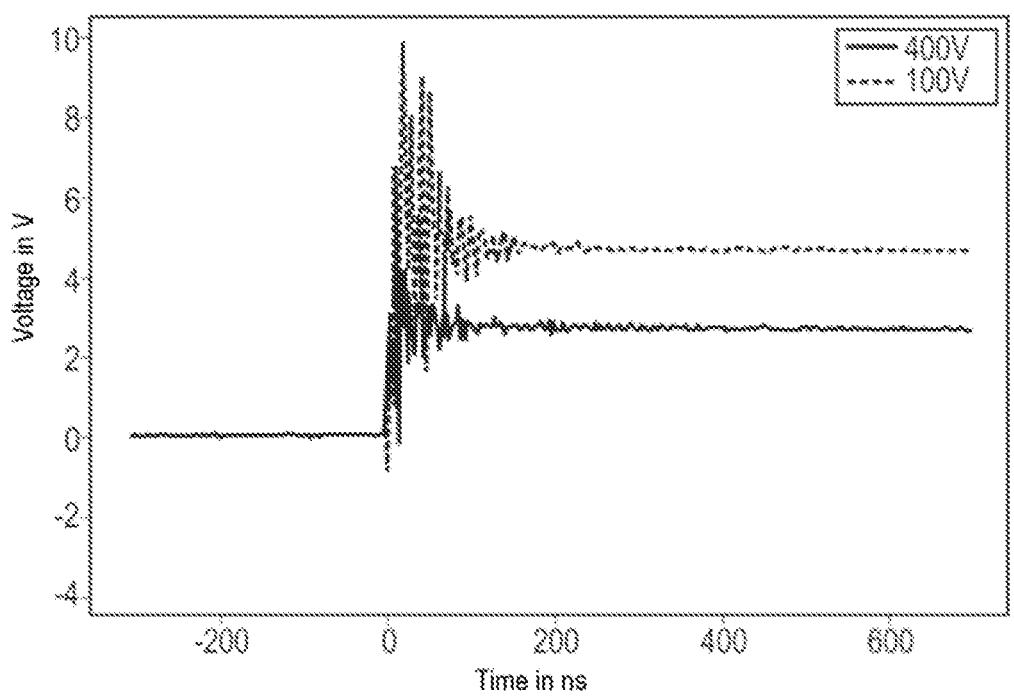
FIG. 14 illustrates, in the form of curves, the signal measured across the terminals of the capacitor of the reception stage of the device in FIG. 3, as returned by the analog-digital converter, in the course of an attack employing an electromagnetic injection probe, during which attack pulses were fired.

Comparative results with protection with a ferrite sheet or layer are shown in FIG. 14. The attack probe used consisted of a five-turn ferrite rod of 2 mm diameter made of the material sold by the company Fair-Rite under the denomination "67 material", and pulses were fired with two different attack-voltage values, 100 V and 400 V, respectively.

It may be seen that the supervising device 1 according to the invention is able to detect attack voltages of 80 V or more, and that, in the presence of the ferrite sheet or layer, these attack voltages are not able to generate faults in the microcontroller to be protected, in particular by creating faults that shift the timing of logic processes.

The ferrite sheet or layer therefore forms an effective passive shield against fault injections, and may furthermore serve to detect attacks and their intensity level, the reception stage 4, and more particularly measurement of the voltage across the terminals of the capacitor C1, being used for this purpose.

To evaluate the passive shielding provided by a sintered, ferrite sheet or layer against a side-channel attack in which electromagnetic activity was sensed, other tests were carried out in which the sintered, ferrite sheet or layer was applied to an ATmega328 microcontroller manipulating an AES encryption, by way of electronic component to be protected.

The inventors observed that without passive shielding by the ferrite sheet or layer, and without jamming, the encryption key of the ATmega328 microcontroller was found in 35 acquisitions, whereas, in the presence of the ferrite sheet or layer, it was necessary to amplify the signal by at least 20 dB more and to make seven times more acquisitions to find the encryption key.

With jamming and with a high pulse repetition rate, 200 kHz for example, or in the presence of a thicker ferrite sheet or layer, it was even more difficult to find the encryption key.

Therefore, although it is needless to quantify the obtained protective effect, it may be concluded that the time required to make a successful attack will be long enough to be dissuasive to an attacker.

All the tests presented above were carried out with pulses the need in terms of current of which was only high during each pulse. Since the latter were very brief, of the order of one tenth of a microsecond, the average current was very low and, as a result, the whole of the device 1 according to the invention may be supplied with power autonomously by a rechargeable battery 8 of only a few mA·h, and is able to operate even when the circuit to be protected is turned off. The device according to the invention may then transmit pulses at a lower rate in order to verify, for example, the integrity of the ferrite sheet or layer or that the package in which the circuit to be protected is located has not been opened. In case of attack, the device 1 modifies an integrity parameter, for example a register value of the microcontroller 5, which value is transmitted to the circuit to be protected to inform it of an attack or of an attempted intrusion.

The jamming strategy consists in carrying out jamming when it is required, i.e. when a security-critical code is in the process of being executed, but also when it is not required, in order not to inform the attacker of the importance of the underlying activity.

Furthermore, the repetition rate of the jamming may be equal to or a submultiple of the clock frequency of the circuit to be protected, so that the phase noise and spectral power density of the radiation of the circuit to be protected and of the device 1 occupy the same frequency space. This makes it possible to use a pulsed current of lower magnitude than that used when monitoring integrity, and therefore to decrease average electrical power consumption.

The jamming pulses may be defined so as to form frames of n bits, n possibly varying between 1 and 1024, having a random content and a switching frequency identical to the switching frequency of the circuit to be protected. Lastly, the intensity of the jamming may be of at least two values, one very high so as to saturate any probe circuit, the other of same level as the intensity of the radiation of the circuit to be protected.

Figure 15:
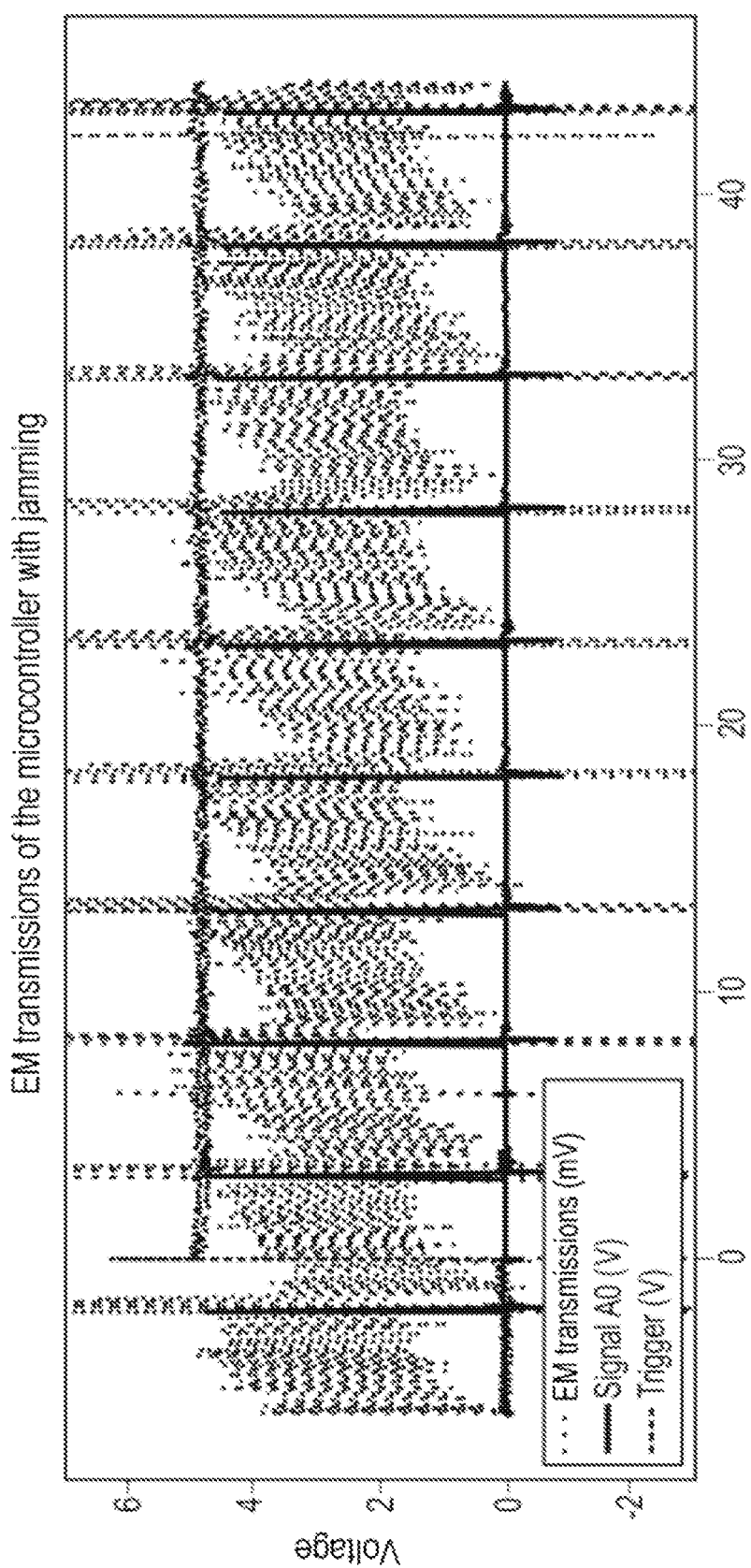
FIG. 15 illustrates, in curve form, the signal recorded by a near-field probe normally used to synchronize an attack with a code in the process of execution, which attack is jammed by the supervising device according to invention.

FIG. 15 shows jamming, the intensity of which is of high value, generating radiation of higher intensity, about 1000 times higher than that of the radiation of the circuit to be protected. The signal was recorded via a near-field probe. The jamming signal delivered by the ferrite sheet or layer 20 here reached several volts, whereas the probe signal output by the circuit to be protected was merely a few millivolts. The intensity of the jamming is therefore very high and is able to saturate the near-field probe, during the transmission of the jamming pulses.

Other advantages and improvements will possibly be capitalized upon without, however, departing from the scope of the invention.

The invention is not limited to the examples that have just been described; features of the illustrated examples may notably be combined together within variants not illustrated.

LIST OF CITED REFERENCES

[1]: Naofumi Homma et al. "*EM Attack Is Non-Invasive?— Design Methodology and Validity Verification of EM Attack Sensor*", LNCS, vol. 8731, Springer-Verlag (2014).

The invention claimed is:

1. A device for protecting and supervising an electronic system comprising at least one electronic component, comprising:
 a pulse transformer comprising:
  a first sheet or layer based on magnetic ferrite powder, to be applied to at least one surface of the electronic system;
  at least one transmission coil and at least one reception coil encircling a first area and a second area of the first ferrite sheet or layer, respectively, the first and second areas being separate from each other,
  a transmission stage connected to the transmission coil and configured to transmit pulses of electrical current to said transmission coil,
  a reception stage connected to the reception coil and configured to detect at least the peak amplitude of the electrical voltage generated by the electromagnetic force across terminals of the reception coil,
a microcontroller comprising:
at least one input-output connected to the transmission stage with a view to triggering the pulses, and
an analog-digital converter, which is connected to the reception stage with a view to informing the electronic system and/or another microcontroller, via a bus, of variations in the peak amplitude across the terminals of the reception coil,
wherein the first ferrite sheet or layer has a complex magnetic permeability ($\mu r=\mu'-j\mu''$) with $j^2=-1$, $\mu'$ being higher than 1, up to at least a frequency equal to 1 kHz, and $\mu''$ being lower than 1 up to at least a frequency of 1 kHz.

2. The device according to claim 1, wherein the first ferrite sheet or layer is made of an alloy of iron oxide, chosen from $Fe_2(Ni_{1-x}Zn_x)O_4$ and $Fe_2(Mn_{1-x}Zn_x)O_4$.

3. The device according to claim 1, wherein the thickness of the first ferrite sheet or layer is comprised between 50 µm and 500 µm.

4. The device according to claim 1, wherein the magnetic ferrite powder of the first sheet or layer has a relative magnetic permeability $\mu r$ the variation in which is smaller than 1% in a temperature range comprising at least the operating temperature range of the electronic system.

5. The device according to claim 4, wherein the temperature range is comprised between 0° C. and 70° C. when the electronic system is intended for commercial applications, or between −40° C. and 85° C. when the electronic system is intended for industrial applications, or between −55° C. and 125° C. when the electronic system is intended for military applications.

6. The device according to claim 1, wherein the reception coil comprises a number of turns higher than that of the transmission coil.

7. The device according to claim 1, wherein the transmission coil comprises a number of turns comprised between 1 and 10 turns.

8. The device according to claim 1, wherein the reception coil comprises a number of turns comprised between 1 and 10 turns.

9. The device according to claim 1, comprising a second ferrite-based sheet or layer that is stacked on top of the first ferrite sheet or layer, and that is not encircled by the transmission and reception coils.

10. The device according to claim 9, wherein the thickness of the second ferrite sheet or layer is comprised between 50 µm and 500 µm.

11. The device according to claim 1, wherein the reception stage comprises, by way of means for detecting the peak amplitude across the terminals of the reception coil, at least a rectifier diode, a capacitor and a means for discharging the capacitor.

12. The device according to claim 11, wherein the means for discharging the capacitor is a resistor or an n-channel MOSFET short-circuiting the capacitor.

13. The device according to claim 1, wherein the reception stage comprises means for detecting the peak amplitude across the terminals of the reception coil, said means for detecting including an operational amplifier configured to act as a peak detector.

14. The device according to claim 1, further comprising at least one film of piezoelectric or pyroelectric material that is polarized in the direction of its thickness, said film being arranged above or below the first ferrite sheet or layer, the reception stage furthermore being configured to detect the peak amplitude of the voltage generated across terminals of the film of piezoelectric or pyroelectric material, and the microcontroller further comprising an analog-digital converter connected to the reception stage with a view to informing the electronic system and/or the other microcontroller, via a bus, of variations in the peak amplitude across the terminals of the film of piezoelectric or pyroelectric material.

15. The device according to claim 14, wherein the film of piezoelectric or pyroelectric material is a film of polyvinylidene fluoride with metallized main faces forming electrodes.

16. The device according to claim 14, wherein the reception stage comprises, by way of means for detecting the peak amplitude across the terminals of the film of piezoelectric or pyroelectric material at least a rectifier diode, a capacitor and a means for discharging the capacitor.

17. The device according to claim 16, wherein the means for discharging the capacitor are a resistor or an n-channel MOSFET short-circuiting the capacitor.

18. The device according to claim 14, wherein the reception stage comprises, by way of means for detecting the peak amplitude of the voltage generated across the terminals of the film of piezoelectric or pyroelectric material, an operational amplifier configured to act as a peak detector.

19. The device according to claim 1, wherein the bus comprises one or more buses for informing the electronic system and/or the other microcontroller is (are) one or more I2C or UART buses the security of which is ensured with a symmetric encryption algorithm.

20. The device according to claim 1, wherein the microcontroller comprises two separate input-outputs connected to the transmission stage, one being dedicated to triggering pulses for monitoring the integrity of the ferrite sheet or layer, the other being dedicated to triggering electromagnetic jamming pulses.

21. The device according to claim 20, wherein the microcontroller further comprises a randomly activated pulse-width modulator for making the widths of jamming pulses emitted by the transmission stage vary randomly.

22. The device according to claim 1, wherein the ferrite sheet or layer with the transmission and reception coils is borne by a flexible carrier that is to be applied against the surface of the electronic system, the device further comprising an electrical battery for powering the microcontroller, said battery being connected to a voltage regulator, a low-dropout voltage regulator, that is configured to regulate the voltage of the battery to a stable voltage, the microcontroller further comprising an analog-digital converter for managing battery charge.

23. The device according to claim 1, further comprising a photodetector the light-level threshold including the openness of a package wherein the electronic system is located.

24. A method for protecting and supervising an electronic system, comprising the following steps:
a/ providing the protective device according to claim 1, this including applying the sheet or layer based on magnetic ferrite powder to at least one surface of the electronic system;
b/ calibrating the device by taking a first measurement of the peak amplitude across the terminals of the reception coil in order to determine a reference value;
c/ once the calibration has been carried out, triggering at least one hardware interrupt on the input-output so as to detect the value of the effective peak amplitude and to compare it to the reference value;

d/ if the comparison in step c/ between the effective value and the reference value corresponds to an attack situation then warning the electronic system and/or another microcontroller.

25. The method according to claim 24, wherein step c/ consists in repeatedly carrying out again and again hardware interrupts.

26. The method according to claim 24, wherein the microcontroller is configured so that the current pulses transmitted by the transmission stage of the device are jamming pulses.

27. The method according to claim 26, wherein repetition rate of the jamming pulses is random.

28. The method according to claim 27, wherein the repetition rate is random at a value close to or submultiple close to the clock frequency of the electronic system to be supervised.

29. The method according to claim 26, wherein the intensity of the jamming pulses has at least two values, one of which, which is intended to saturate any attacking electronic circuit, is higher than the intensity of the radiation of the system to be supervised and the other of which is substantially equal to the intensity of the radiation of the system to be supervised.

* * * * *